United States Patent
Kim

(10) Patent No.: US 7,527,420 B2
(45) Date of Patent: May 5, 2009

(54) BACK LIGHT ASSEMBLY AND LIQUID CRYSTAL DISPLAY APPARATUS HAVING THE SAME

(75) Inventor: Yong-Il Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 27 days.

(21) Appl. No.: 11/686,556

(22) Filed: Mar. 15, 2007

(65) Prior Publication Data

US 2007/0217182 A1    Sep. 20, 2007

(30) Foreign Application Priority Data

Mar. 17, 2006    (KR)    .................... 10-2006-0024649

(51) Int. Cl.
*F21V 7/04*    (2006.01)

(52) U.S. Cl. ........................ 362/634; 362/614; 362/632

(58) Field of Classification Search .................. 362/613, 362/614, 632, 633, 634
See application file for complete search history.

(56) References Cited

U.S. PATENT DOCUMENTS

2007/0127272 A1 *    6/2007    Yang et al. .................. 362/634

* cited by examiner

*Primary Examiner*—John A Ward
(74) *Attorney, Agent, or Firm*—Cantor Colburn LLP

(57) ABSTRACT

A backlight assembly includes a plurality of lamps, a receiving container, a reflective plate and a lamp-securing member. The lamps are arranged substantially parallel to each other and generate light. The receiving container receives the lamps. The reflective plate is disposed between the lamps and the receiving container. The lamp-securing member includes a body disposed on the reflective plate, a lamp-securing portion formed on the body and securing the lamps, a combining portion combined with the receiving container and a slit portion adjacent to the combining portion.

21 Claims, 5 Drawing Sheets

BACK LIGHT ASSEMBLY AND LIQUID CRYSTAL DISPLAY APPARATUS HAVING THE SAME

This application claims priority to Korean Patent Application No. 2006-24649 filed on Mar. 17, 2006, and all the benefits accruing therefrom under 35 U.S.C. §119, the contents of which are herein incorporated by reference in its entirety.

BACKGROUND OF THE INVENTION

1. Field of the Invention

The present invention relates to a backlight assembly and a liquid crystal display apparatus having the backlight assembly. More particularly, the present invention relates to a backlight assembly capable of preventing a lamp-securing member from moving and a liquid crystal display apparatus having the backlight assembly.

2. Description of the Related Art

In general, a liquid crystal display ("LCD") apparatus includes an LCD panel displaying images and a backlight assembly providing the LCD panel with light. The backlight assembly applied to a large-sized LCD apparatus includes a plurality of lamps arranged in parallel to each other in order to increase brightness.

Furthermore, the backlight assembly includes a receiving container, a reflective plate and a lamp-securing member. The receiving container receives the lamps. The reflective plate reflects light toward the LCD panel. The lamp-securing member secures a central portion of each of the lamps to prevent the lamp from moving. The lamp-securing member is combined with the receiving container by using a hook, and the reflective plate is between the lamp-securing member and the receiving container.

There is a gap between the lamp-securing member and the reflective plate and between the reflective plate and the receiving container.

The gap causes the lamp-securing member to move, and the lamp-securing member and the receiving container are separated from each other. Furthermore, the lamp-securing member and the receiving container collide with each other to make a noise.

BRIEF SUMMARY OF THE INVENTION

An exemplary embodiment provides a backlight assembly capable of preventing the movement of a lamp-securing member.

An exemplary embodiment provides a liquid crystal display apparatus having the above-mentioned backlight assembly.

In an exemplary embodiment, a backlight assembly includes a plurality of lamps, a receiving container, a reflective plate and a lamp-securing member. The lamps are arranged substantially parallel to each other and generate light. The receiving container receives the lamps. The reflective plate is disposed between the lamps and the receiving container. The lamp-securing member includes a body, a lamp-securing portion formed on the body and securing the lamps, a combining portion combined with the receiving container and a slit portion adjacent to the combining portion. The body may be on the reflective plate or between reflective plate and the receiving container.

In an exemplary embodiment, the combining portion includes a pressing plate and a hook formed under the pressing plate and combined with the receiving container. The pressing plate protrudes upward from the body by a predetermined height and the height of the pressing plate may be about 0.2 millimeter (mm) to about 0.6 millimeter (mm).

In an exemplary embodiment, the slit portion includes a slit and a width of the slit is about 0.6 mm to about 1.2 mm.

In an exemplary embodiment, the reflective plate includes an opening overlapping with the combining portion and has a width greater than a width of the combining portion.

In an exemplary embodiment, the backlight assembly may further include a diffusing plate disposed on the lamps and diffusing the light generated by the lamps and at least one optical member disposed on the diffusing plate. The lamp-securing member may further include a supporting portion formed on the body and supporting the diffusing plate.

In an exemplary embodiment, a liquid crystal display apparatus includes a backlight assembly generating light and a liquid crystal display panel disposed on the backlight assembly and displaying images. The backlight assembly includes a plurality of lamps, a receiving container, a reflective plate and a lamp-securing member. The lamps are arranged substantially parallel to each other and generate light. The receiving container receives the lamps. The reflective plate is disposed between the lamps and the receiving container. The lamp-securing member includes a body, a lamp-securing portion formed on the body and securing the lamps, a combining portion combined with the receiving container and a slit portion adjacent to the combining portion. The combining portion includes a pressing plate and a hook formed under the pressing plate and combined with the receiving container.

In an exemplary embodiment, the lamp-securing member, the reflective plate and the receiving container make contact with each other. Movement of the lamp-securing member is reduced or effectively prevented. Furthermore, the lamp-securing portion may be easily combined with the receiving container by means of the slit portion adjacent to the combining portion.

In an exemplary embodiment, a method of forming a liquid crystal display apparatus includes forming a backlight assembly and disposing a liquid crystal display panel on the backlight assembly. The liquid crystal display apparatus displays images. Forming a backlight assembly includes arranging a plurality of lamps substantially parallel to each other, disposing a reflective plate between the lamps and a receiving container, disposing a lamp-securing member to secure the lamps and combining the lamp-securing member with the receiving container. The lamp-securing member includes a body, a lamp-securing portion formed on the body and securing the lamps, a combining portion and a slit portion adjacent to the combining portion. The combining lamp-securing member with the receiving container includes the combining portion being combined with the receiving container through the reflective plate.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
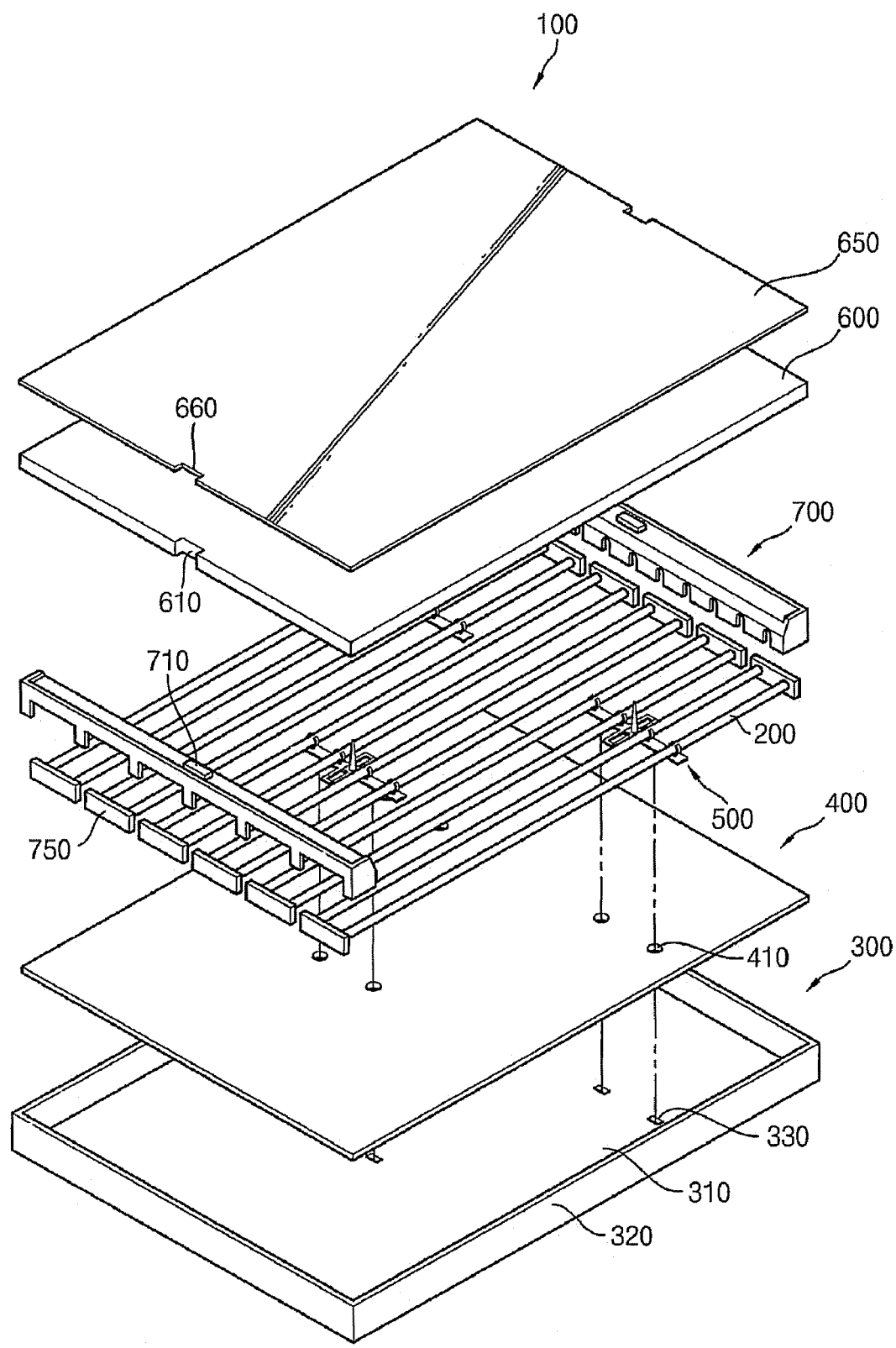
FIG. 1 is an exploded perspective view illustrating an exemplary embodiment of a backlight assembly according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below," "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "upper" or "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
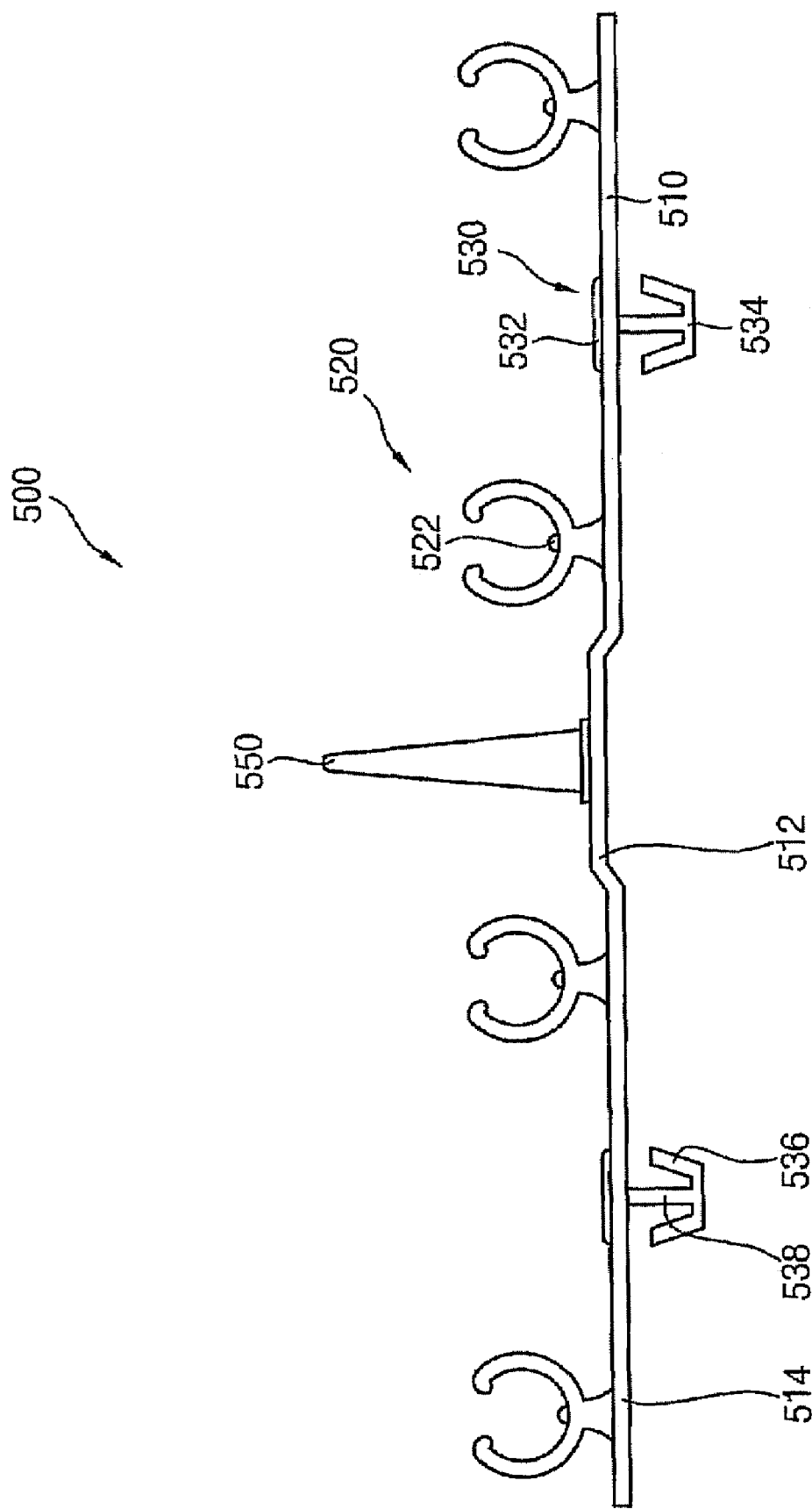
FIG. 2 is a lateral view illustrating a lamp-securing member of the backlight assembly illustrated in FIG. 1.
Figure 3:
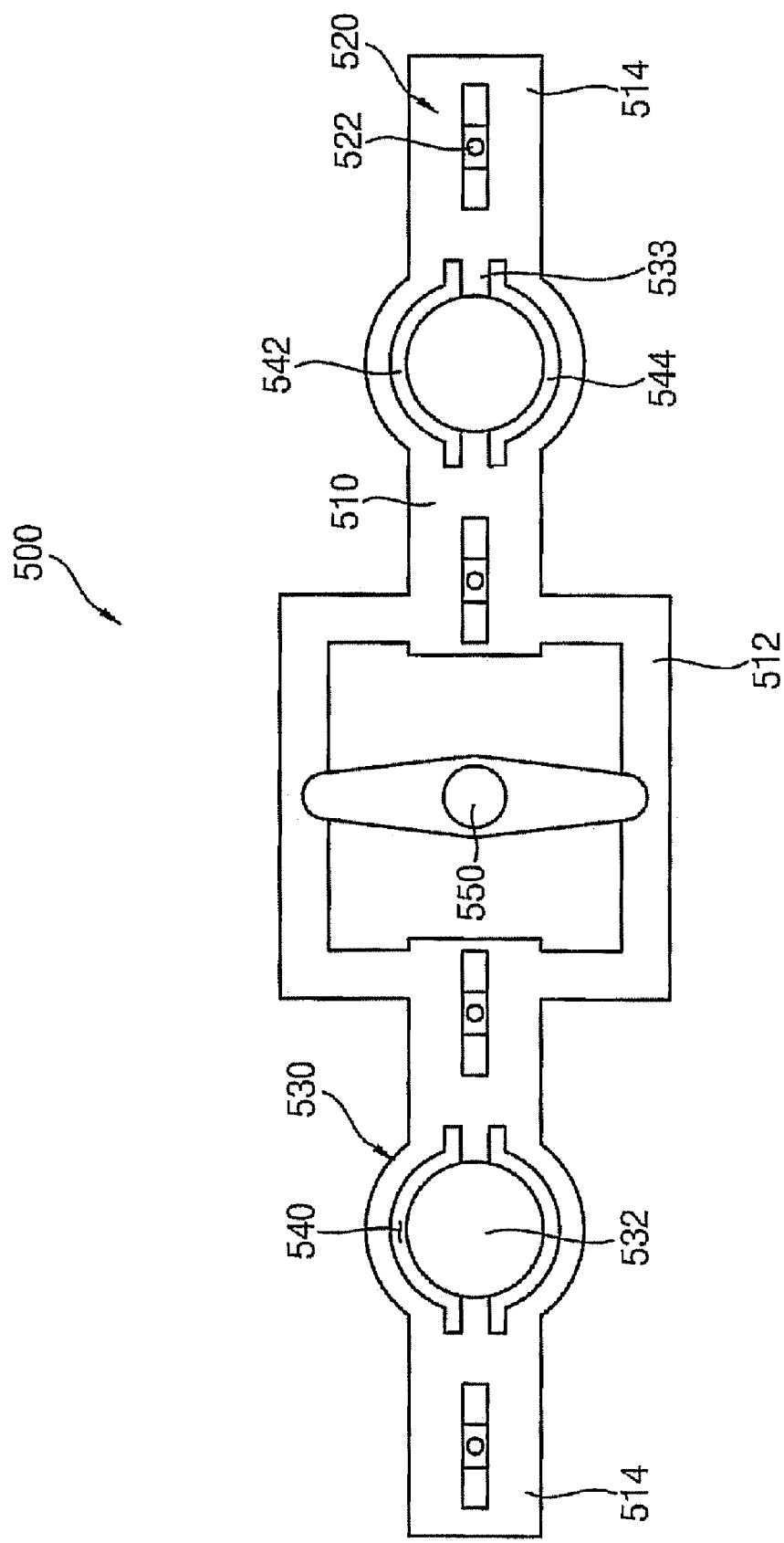
FIG. 3 is a plan view illustrating the lamp-securing member illustrated in FIG. 2.

FIG. 1 is an exploded perspective view illustrating an exemplary embodiment of a backlight assembly according to the present invention. FIG. 2 is a lateral view illustrating a lamp-securing member of the backlight assembly illustrated in FIG. 1. FIG. 3 is a plan view illustrating the lamp-securing member illustrated in FIG. 2.

Referring to FIGS. 1 to 3, a backlight assembly 100 includes a plurality of lamps 200, a receiving container 300, a reflective plate 400 and a lamp-securing member 500.

The lamps 200 are arranged substantially parallel to each other. Each of the lamps 300 generates light in response to a driving voltage. In one exemplary embodiment, the lamp 200 may be a cold cathode fluorescent lamp having a cylindrical shape.

The receiving container 300 has a bottom plate 310 and a side portion 320 vertically extending from the bottom plate 310 to receive the lamps 200. In one exemplary embodiment, the receiving container 300 may include a metal having a relatively small deformation and a relatively great strength.

The reflective plate 400 is disposed between the lamps 200 and the bottom plate 310 of the receiving container 300. The reflective plate 400 reflects light generated by the lamps 200 in a substantially upward direction. In one exemplary embodiment, the reflective plate 400 may include a material having a relatively high reflectivity.

The lamp-securing member 500 may be disposed adjacent to a substantially central portion of each of the lamps 200 to prevent the lamps 200 from moving and/or sagging. In exemplary embodiments, the lamp-securing member 500 may include a plastic material and/or may be manufactured through a molding process. Referring to FIGS. 2 and 3, the lamp-securing member 500 includes a body 510, a plurality of lamp-securing portions 520, a plurality of combining portions 530 and a slit portion 540.

The body 510 is disposed on the reflective plate 400. In an alternative exemplary embodiment, the body 510 may be disposed between the reflective plate 400 and the receiving container 300. The body 510 may have a first body portion 512 and a second body portion 514. The first body portion 512 may have a substantially rectangular shape. The first body portion 512 may include a solid structure or may include a rectilinear type frame with an open area surrounded by the frame as illustrated in FIG. 3. The second body portion 514, which are hereinafter referred to as side portions, extend from sides of the rectangular first body portion 512 and being opposite to each other when viewed from a plan view relative to the first body portion 512. The side portions 514 may also have a substantially rectilinear shape. In an alternative exemplary embodiment, the body 510 may have a stripe-shape.

The lamp-securing portions 520 are formed on the body 510 and are spaced apart from each other by a predetermined distance to secure the lamps 200. Each of the lamp-securing portions 520 may have a lamp-securing protrusion 522 to secure the lamps 200. In exemplary embodiments, the lamp-securing protrusion 522 makes point contact with the lamp 200 to reduce or effectively prevent light generated by the lamp 200 from being absorbed by the lamp-securing portion 520. The lamp-securing portion 520 may have an entrance or opening, of which a width increases upward relative to the body 510, so that the lamp 200 is easily inserted into the lamp-securing portion 520.

The combining portions 530 may be connected to the body 510 and are spaced apart from each other by a predetermined distance. In exemplary embodiments, the combining portion 530 does not substantially overlap with the lamp-securing portion 520. In one exemplary embodiment, the combining portion may be alternated with the lamp-securing portion 520 along the second body portion 514 in a direction away from the first body portion 512. As illustrated in FIGS. 2 and 3, the combining portion 530 may be formed at a portion of the body 510 which is different from a portion of the body 510 at which the lamp-securing portion 520 is formed. Advantageously, when a pressure is applied to the combining portion 530 in order to combine the combining portion 530 with the receiving container 300, the lamp-securing portion 520 may not hinder the combining portion 530 from being pressed.

The combining portion 530 includes a pressing plate 532 and a combining member 534, such as a hook. When the combining portion 530 is combined with the receiving container 300, a pressure is externally applied to the pressing plate 532. The combining member 534 is disposed under the pressing plate 532, protruding below the body 510 and is combined with the receiving container 300. In exemplary embodiments, the combining member 534 may be attached to and form a single unit with the pressing plate 532.

As in the illustrated exemplary embodiment, one combining member 534 is disposed on the second body portion 514 on opposing sides of the first body portion 512. In alternative exemplary embodiments, a same or different number of the combining member 534 may be disposed on the second body portion 514 on opposing sides of the first body portion 512. More than one of the combining member 534 may also be disposed on the second body portion 514 on opposing sides of the first body portion 512.

In exemplary embodiments, the pressing plate 532 has a substantially round shape. The pressing plate 532 essentially delivers or transfers the externally provided pressure to the hook 534 so that the hook 534 is combined with the receiving container 300. When the pressure is applied to the pressing plate 532, the hook 534 moves downward so that the hook 534 is combined with the receiving container 300. A slit portion 540 is formed at the body 510 adjacent to the combining portion 530 so that the combining portion 530 may move easily.

Portions of the pressing plate 532, such as ends or sides which are substantially opposite to each other, may be connected to the body 510. As illustrated in FIG. 3, the pressing plate 532 may be connected to the body by two opposing connecting portions 533. The pressing plate 532 may be connected to the body 510 by any of a number of a plurality of connecting portions as is suitable for the purpose described herein.

The hook 534 is formed under the pressing plate 532 and is combined with the receiving container 300. Referring to FIG. 1, the hook 534 is combined with the bottom plate 310 of the receiving plate 300. The bottom plate 310 has a combining hole 330 combined with the hook 534.

The hook 534 has a first hook portion 536 and a second hook portion 538 disposed between the first hook portion 536 and the pressing plate 532. The second hook portion 538 extends in a substantially vertical and perpendicular direction with respect to the body 510. A width of the first hook portion 536 increases, as a distance between a lower end of the hook 534 and the pressing plate 532 decreases. A width of an end of the first hook portion 536 adjacent to the pressing plate 532 is greater than a width of the second hook portion 538. Advantageously, the hook 534 is easily inserted to the combining hole 330 of the receiving container 300 and is firmly combined with the combining hole 330 of the receiving container 300.

A cross-section of the hook 534 may have various shapes. In exemplary embodiments, the cross-section of the hook 534 has a substantially rectangular shape when viewed on a plane. When viewed on a plane, a cross-section, shape and/or dimensions of the combining hole 330 may correspond to the hook 534. As illustrated in FIG. 1, the cross-section of the combining hole 330 has a rectangular shape substantially the same and corresponding to the shape of the cross-section of the hook 534. In an alternative exemplary embodiment, the cross-section of the combining hole 330 may have a round shape corresponding to the combining member 534. The combining hole 330 and the combining member 534 may have any of a number of shapes such as to firmly combine the lamp-securing member 500 with the receiving container 300.

The body 510 may be partially opened or a portion of the body 510 may be removed to form the slit portion 540. As in the illustrated embodiment of FIG. 3, the slit portion 540 may correspond to a profile of an outer edge of the combining portion 530. The combining portion 530 may easily move or be displaced in a vertical direction substantially perpendicular to the body 510 by the slit portion 540.

As illustrated in FIG. 3, the slit portion 540 includes a first slit 542 and a second slit 542 opposing each other relative to the pressing plate 532. The slit portion 540 may have a substantially round or arced shape and surrounds a portion of the pressing plate 532. The pressing plate 532 is connected to the body 510 by pressing plate 532 connecting portions disposed between the first slit 542 and the second slit 544. In exemplary embodiment, the slit portion 540 may include any of a number of a plurality of slits, such as more than two. When a size of the slits is excessively small the combining portion 530 may not easily move. A portion of the body 510 at which the slit portion 540 is formed has a relatively greater width than a remainder of the second body portion 514.

As in the illustrated embodiment, the lamp-securing member 500 has the slit portion 540 adjacent to the combining portion 530 so that the combining portion 530 may easily be moved in a vertical direction by an external pressure. Advantageously, the combining portion 530 is easily combined with the combining hole 330 formed at the bottom plate 310 of the receiving container 300.

Referring again to FIG. 1, the backlight assembly 100 may further include a diffusing plate 600 and at least one optical sheet 650. The diffusing plate 600 is disposed on the lamps 200 and diffuses light generated by the lamps 200. The optical sheet 650 is disposed on the diffusing plate 600 and improves characteristics of light exiting from the diffusing plate 600.

The backlight assembly 100 may further include a side mold 700 and a plurality of lamp holders 750. The side mold 700 covers ends of the lamps 200 and supports the diffusing plate 600 and the optical sheet 650. The lamp holders 750 secure the ends of each of the lamps 200 to reduce or effectively prevent movement of the lamps 200. A protrusion 710 may be formed on the side mold 700. A first recess 610 is formed at the diffusing plate 600 and a second recess 660 is formed at the optical sheet 650. The first and the second recesses 610 and 660 are combined with the protrusion 710 of the side mold 700 to secure the diffusing plate 600 and the optical sheet 650.

Referring again to FIGS. 2 and 3, the lamp-securing member 500 may further include a supporting portion 550 formed on the body 510 to support the diffusing plate 600. In one exemplary embodiment, the supporting portion 550 may be formed on a central portion of the body 510 such as corresponding to the first body portion 512. As illustrated in FIG. 3, the supporting portion 550 spans the open area and is connected to the frame of the first body portion 512. The central portion of the body 510 and/or the first body portion 512 on which the supporting portion 550 is formed may be disposed in a position relatively higher than the second body portion 514 surrounding the central portion in a direction perpendicular to the body 510 when viewed from the side as illustrated in FIG. 2. Advantageously, the supporting portion 550 may move in a vertical direction so that damage from external impacts to the diffusing plate 600 may be reduced or effectively prevented.

Figure 4:
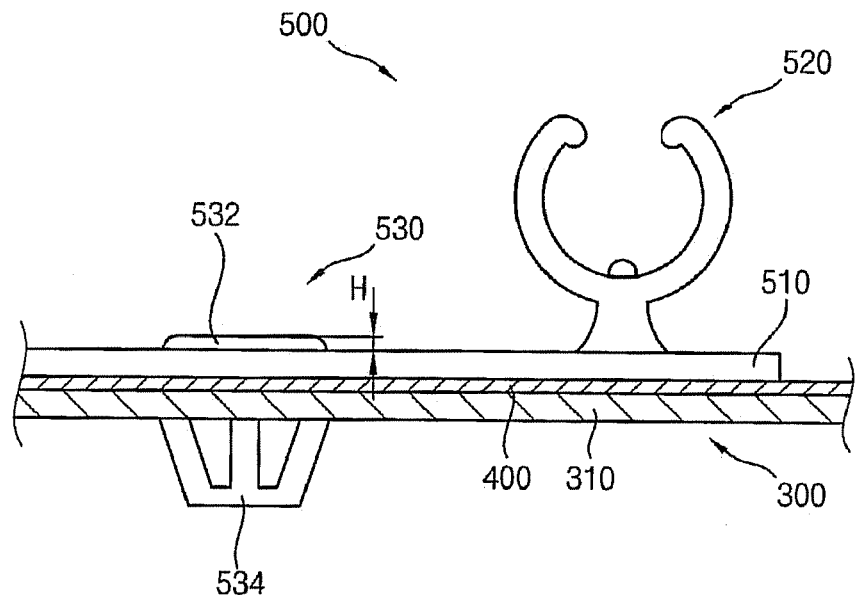
FIG. 4 is an enlarged plan view illustrating a portion of the backlight assembly illustrated in FIG. 1.

FIG. 4 is an enlarged view illustrating a portion of the backlight assembly illustrated in FIG. 1.

Referring to FIG. 4, the reflective plate 400 makes contact with an upper portion of the receiving container 300 and the body 510 of the lamp-securing member 500 makes contact with an upper portion of the reflective plate 400.

In one exemplary embodiment, the reflective plate 400 makes contact with the receiving container 300 without a gap between the reflective plate 400 and the receiving container 300 and the lamp-securing member 500 makes contact with the reflective plate 400 without a gap between the reflective plate 400 and the lamp-securing member 500. Advantageously, movement of the receiving container 300, the reflective plate 400 and the lamp-securing member 500 may be reduced or effectively prevented.

As in the illustrated embodiment of FIG. 4, the reflective plate 400 makes contact with the receiving container 300 without a gap between the reflective plate 400 and the receiving container 300, and the lamp-securing member 500 makes contact with the reflective plate 400 without a gap between the reflective plate 400 and the lamp-securing member 500. Advantageously, movement of the receiving container 300, the reflective plate 400 and the lamp-securing member 500 may be reduced or effectively prevented. Furthermore, a noise due to the gaps between the reflective plate 400 and the receiving container 300 and between the reflective plate 400 and the lamp-securing member 500 may be reduced or effectively prevented. In exemplary embodiments, an error in an assembling process, the gap set in the assembling process may have a minus value or create an interference fit.

The pressing plate 532 protrudes upward from the body 510 by a predetermined height H. An external pressure, such as may be applied by a finger of an operator, may be easily applied to the pressing plate 532 and the combining portion 530 may be easily combined with the combining hole 330 of the receiving container 300. In exemplary embodiments, the height H of the pressing plate 532 protruding from the body 510 is about 0.2 millimeter (mm) to about 0.6 millimeter (mm). In one exemplary embodiment, the height H of the pressing plate 532 protruding from the body 510 is about 0.4 millimeter (mm).

Figure 5:
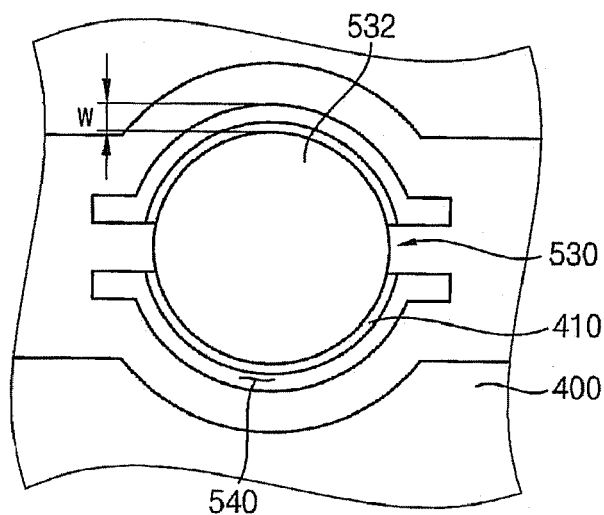
FIG. 5 is an enlarged plan view illustrating the lamp-securing portion combined with a reflective plate illustrated in FIG. 4.

FIG. 5 is an enlarged plan view illustrating the lamp-securing portion combined with the reflective plate illustrated in FIG. 4.

Referring to FIGS. 1 and 5, the reflective plate 400 has an opening 410 that overlaps with the combining portion 530 and has a width greater than a width of the combining portion 530. The opening 410 corresponds in location and/or dimension with the combining hole 330 of the receiving container 300 and the combining member 534 of the lamp securing member 500. In exemplary embodiments, the combining member 534, opening 410 and the combining hole 330 allow the lamp-securing member 500, reflective plate 400 and the receiving container 300 to be securely combined with each other and reduce or effectively prevent movement therebetween.

Particularly, the width of the opening 410 is greater than a width of the pressing plate 532 by a predetermined extent. Advantageously, the reflective plate 400 may not hinder the combining portion 530 from moving in a vertical direction.

The body 510 of the lamp-securing member 500 is partially opened to form the slit portion 540 and the slit of the slit portion 540 has a predetermined width W taken in a direction substantially perpendicular to an outer edge of the pressing plate 532 to an outer edge of the slit as illustrated in FIG. 5. In exemplary embodiments, the width W of the slit may be about 0.6 mm to about 1.2 mm. In one exemplary embodiment the width W of the slit may be about 0.9 mm.

Figure 6:
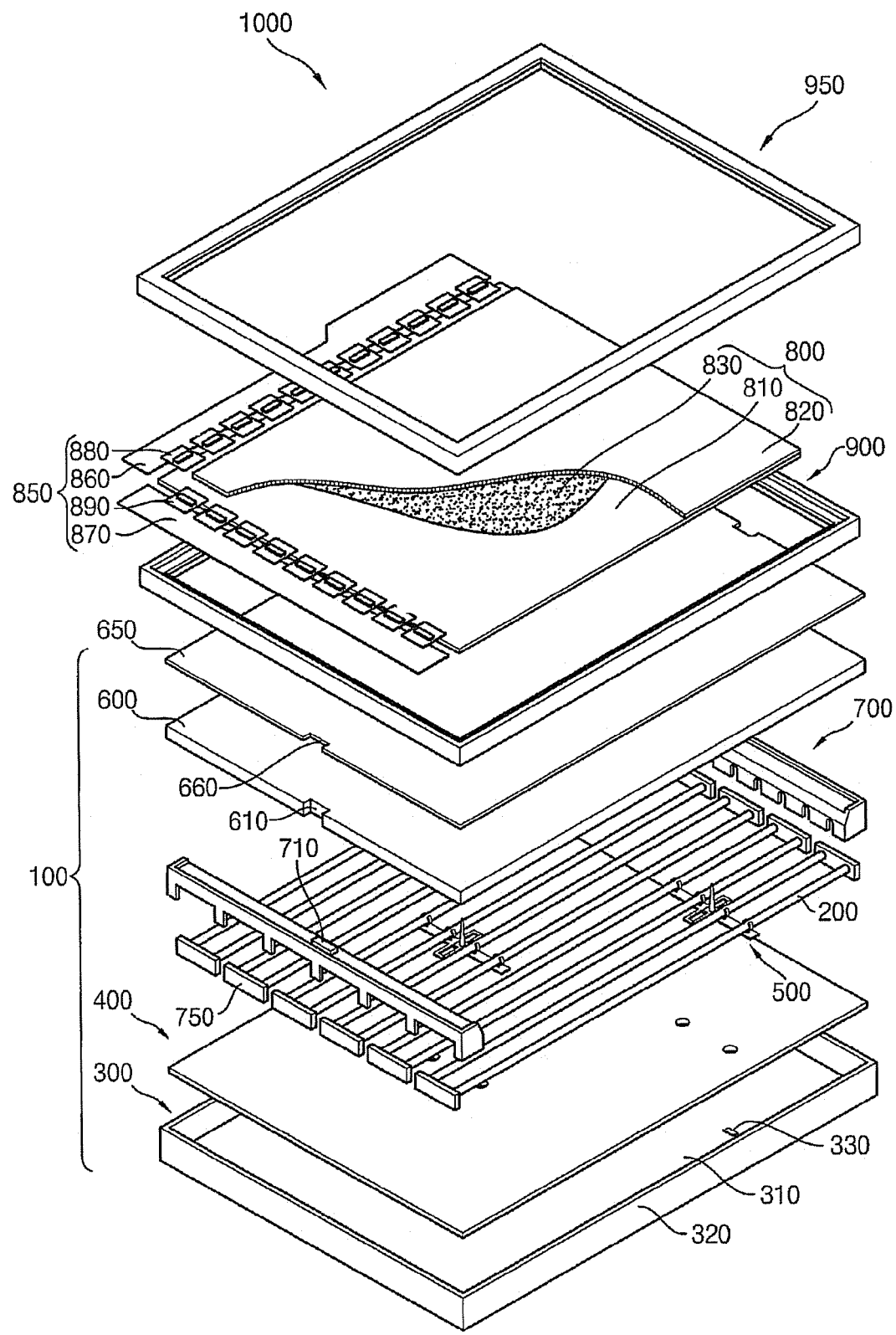
FIG. 6 is an exploded perspective view illustrating an exemplary embodiment of a liquid crystal display apparatus according to the present invention.

FIG. 6 is an exploded perspective view illustrating an exemplary embodiment of a liquid crystal display apparatus according to the present invention.

Referring to FIG. 6, a liquid crystal display ("LCD") apparatus 1000 includes a backlight assembly 100 generating light and a LCD panel 800 disposed on the backlight assembly 100 to display an image.

The backlight assembly 100 is substantially the same as the backlight assembly illustrated in FIGS. 1 to 5. Thus, any further description will be omitted.

The LCD panel 800 includes a first substrate 810, a second substrate 820 that faces and is combined with the first substrate 810 and a liquid crystal layer 830 interposed between the first substrate 810 and second substrate 820.

In exemplary embodiments, the first substrate 810 has a plurality of thin-film transistors ("TFT") (not shown) arranged in a matrix configuration. A source terminal and a gate terminal of each of the TFTs are electrically connected to a data line and a gate line, respectively. A drain terminal of the TFT is electrically connected to a pixel electrode including a transparent conductive material.

In exemplary embodiments, the second substrate 820 may have colored pixels, such as red, green and blue pixels, which have a thin-film shape. The second substrate 820 may further have a common electrode including a transparent conductive material.

The LCD apparatus 1000 may further include a driving circuit part 850 to operate the LCD panel 800.

The driving circuit part 850 includes a data printed circuit board ("PCB") 860 providing the LCD panel 800 with a data-driving signal, a gate PCB 870 providing the LCD panel 800 with a gate-driving signal, a data-driving circuit film 880 electrically connecting the data PCB 860 to the LCD panel 800 and a gate-driving circuit film 890 electrically connecting the gate PCB 870 to the LCD panel 800.

The LCD apparatus 1000 may further include a middle mold 900 and a top chassis 950. The middle mold 900 secures the optical sheet 650 and the diffusing plate 600. The top chassis 950 secures a peripheral portion of each of the middle mold 900 and the LCD panel 800 and is combined with the receiving container 300.

As in the illustrated exemplary embodiments, a lamp-securing member, a reflective plate and a receiving container make contact with each other. A combining portion of the lamp-securing member is combined with the receiving container. Advantageously, movement of the lamp-securing member is reduced or effectively prevented.

As in the illustrated exemplary embodiments, the lamp-securing member has a slit portion adjacent to a pressing plate and the pressing plate protrudes upward from a body of the lamp-securing member. Advantageously, the combining portion of the lamp-securing member may be easily combined with a combining hole of the receiving member.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
    a plurality of lamps arranged substantially parallel to each other and generating light;
    a receiving container receiving the lamps;
    a reflective plate disposed between the lamps and the receiving container; and
    a lamp-securing member including:
        a body;
        a lamp-securing portion formed on the body and securing the lamps;
        a combining portion combined with the receiving container; and
        a slit portion adjacent to the combining portion.

2. The backlight assembly of claim 1, wherein the combining portion includes a pressing plate; and a hook formed under the pressing plate and combined with the receiving container.

3. The backlight assembly of claim 2, wherein the pressing plate protrudes upward from the body by a predetermined height.

4. The backlight assembly of claim 3, wherein the height of the pressing plate is about 0.2 millimeter (mm) to about 0.6 millimeter (mm).

5. The backlight assembly of claim 1, wherein the slit portion includes a slit and a width of the slit is about 0.6 mm to about 1.2 mm.

6. The backlight assembly of claim 1, wherein the reflective plate includes an opening overlapping with the combining portion and has a width greater than a width of the combining portion.

7. The backlight assembly of claim 1, further comprising:
    a diffusing plate disposed on the lamps and diffusing the light generated by the lamps; and
    an optical member disposed on the diffusing plate.

8. The backlight assembly of claim 7, wherein the lamp-securing member further includes a supporting portion formed on the body and supporting the diffusing plate.

9. The backlight assembly of claim 8, wherein the lamp securing portion and the combining portion are alternated from the supporting portion in a direction away from the supporting portion.

10. The backlight assembly of claim 8, wherein the lamp securing portion includes:
    an opening, a lamp being received into the opening; and
    a contact member protruding into the opening from an inner edge of the lamp securing portion and making contact with the lamp.

11. The backlight assembly of claim 1, wherein the body is disposed on the reflective plate.

12. The backlight assembly of claim 1, wherein the body is disposed between the reflective plate and the receiving container.

13. A liquid crystal display apparatus comprising:
    a backlight assembly generating light and comprising:
        a plurality of lamps arranged substantially parallel to each other and generating light;
        a receiving container receiving the lamps;
        a reflective plate disposed between the lamps and the receiving container; and
        a lamp-securing member including a body, a lamp-securing portion formed on the body and securing the lamps, a combining portion combined with the receiving container and a slit portion adjacent to the combining portion; and
    a liquid crystal display panel disposed on the backlight assembly and displaying images.

14. The liquid crystal display apparatus of claim 13, wherein the combining portion includes a pressing plate and a hook formed under the pressing plate and combined with the receiving container.

15. The liquid crystal display apparatus of claim 14, wherein the pressing plate protrudes from the body by a height from the body, the height being about 0.2 millimeter (mm) to about 0.6 mm; and
    wherein the slit portion includes a slit having a width of about 0.6 mm to about 1.2 mm.

16. The liquid crystal display apparatus of claim 15, wherein the slit portion includes at least two slits disposed at opposing sides of the pressing plate.

17. The liquid crystal display apparatus of claim 14, wherein the reflective plate includes an opening corresponding to the combining portion and the receiving container includes a combining member corresponding to the combining portion, the lamp securing member being secured to the receiving container through the combining portion, the opening and the combining member.

18. The liquid crystal display apparatus of claim 13, wherein the body is disposed on the reflective plate.

19. The liquid crystal display apparatus of claim 13, wherein the body is disposed between the reflective plate and the receiving container.

20. A method of forming a liquid crystal display apparatus, the method comprising:
    forming a backlight assembly; and
    disposing a liquid crystal display panel on the backlight assembly, the liquid crystal display apparatus displaying images;
    wherein the forming a backlight assembly comprises:
        arranging a plurality of lamps substantially parallel to each other;
        disposing a reflective plate between the lamps and a receiving container;
        disposing a lamp-securing member to secure the lamps, the lamp-securing member including a body, a lamp-securing portion formed on the body and securing the lamps, a combining portion and a slit portion adjacent to the combining portion; and combining the lamp-securing member with the receiving container, wherein the combining portion is combined with the receiving container through the reflective plate.

21. The method of claim 20, wherein the combining the lamp-securing member with the receiving container includes contacting the lamp securing member, the reflective plate and the receiving container with each other.

* * * * *